United States Patent
Schubert et al.

(10) Patent No.: US 12,003,349 B2
(45) Date of Patent: *Jun. 4, 2024

(54) SMART GATEWAY DEVICES, SYSTEMS AND METHODS FOR PROVIDING COMMUNICATION BETWEEN HVAC SYSTEM NETWORKS

(71) Applicant: Johnson Controls Tyco IP Holdings LLP, Milwaukee, WI (US)

(72) Inventors: Shawn D. Schubert, Oak Creek, WI (US); Donald A. Gottschalk, Wauwatosa, WI (US); Daniel M. Curtis, Franklin, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,541

(22) Filed: Apr. 24, 2023

(65) Prior Publication Data
US 2023/0261902 A1 Aug. 17, 2023

Related U.S. Application Data

(63) Continuation of application No. 17/365,124, filed on Jul. 1, 2021, now Pat. No. 11,637,720, which is a
(Continued)

(51) Int. Cl.
*H04L 12/00* (2006.01)
*H04L 12/28* (2006.01)
(Continued)

(52) U.S. Cl.
CPC .......... *H04L 12/66* (2013.01); *H04L 12/2816* (2013.01); *H04L 12/2832* (2013.01);
(Continued)

(58) Field of Classification Search
CPC . H04L 2012/2847; H04L 67/08; H04L 12/66; H04L 12/2832; H04L 67/53; H04L 67/12; H04L 12/2816
(Continued)

(56) References Cited

U.S. PATENT DOCUMENTS 6,249,516 B1 6/2001 Brownrigg et al.
7,163,158 B2 1/2007 Rossi et al.
(Continued)

FOREIGN PATENT DOCUMENTS

CN 1442788 A 9/2003
CN 1708742 A 12/2005
(Continued)

OTHER PUBLICATIONS

CN First Office Action and Search Report for CN Appl. Ser. No. 201710807656.8 dated Jul. 31, 2020 (43 pages).
(Continued)

*Primary Examiner* — Frantz Coby
(74) *Attorney, Agent, or Firm* — Foley & Lardner LLP

(57) ABSTRACT

A smart gateway device for a first network associated with a building management system (BMS) is configured to discover a physical device and generate a new virtual device responsive to a determination that a device identifier of the physical device does not match any device identifiers in a virtual device registry. The virtual device registry provides mapping between the new virtual device and the physical device. One or more data points of the new virtual device correspond to one or more data points of the physical device. The smart gateway device is configured to receive data values for the one or more data points of the physical device and update the one or more data points of the new virtual device with the data values for the one or more data points
(Continued)

of the physical device. The virtual device is configured to represent the physical device on the first network.

20 Claims, 13 Drawing Sheets

Related U.S. Application Data continuation of application No. 16/531,249, filed on Aug. 5, 2019, now Pat. No. 11,057,244, which is a continuation of application No. 15/261,843, filed on Sep. 9, 2016, now Pat. No. 10,419,243.

(51) Int. Cl.
*H04L 12/66* (2006.01)
*H04L 67/08* (2022.01)
*H04L 67/12* (2022.01)
*H04L 67/53* (2022.01)

(52) U.S. Cl.
CPC .............. *H04L 67/08* (2013.01); *H04L 67/12* (2013.01); *H04L 67/53* (2022.05); *H04L 2012/2847* (2013.01)

(58) Field of Classification Search
USPC .................................................. 709/223–224
See application file for complete search history.

(56) References Cited

U.S. PATENT DOCUMENTS

| | | | |
|---|---|---|---|
| 7,437,150 B1 | 10/2008 | Morelli et al. | |
| 7,535,888 B1 | 5/2009 | Carlucci et al. | |
| 7,664,573 B2 | 2/2010 | Ahmed | |
| 7,676,300 B2 | 3/2010 | Kim et al. | |
| 7,715,951 B2 | 5/2010 | Forbes et al. | |
| 7,774,102 B2 | 8/2010 | Butler et al. | |
| 7,775,452 B2 | 8/2010 | Shah et al. | |
| 8,086,757 B2 | 12/2011 | Chang | |
| 8,099,195 B2 | 1/2012 | Imes et al. | |
| 8,452,906 B2 | 5/2013 | Grohman | |
| 8,560,125 B2 | 10/2013 | Wallaert et al. | |
| 8,561,065 B2 * | 10/2013 | Cunningham | G06F 9/5077 718/1 |
| 8,581,441 B2 | 11/2013 | Rotzoll et al. | |
| 8,584,228 B1 | 11/2013 | Brandwine et al. | |
| 8,798,796 B2 | 8/2014 | Grohman et al. | |
| 8,839,240 B2 * | 9/2014 | Barrett | G06F 9/45558 718/1 |
| 8,881,141 B2 * | 11/2014 | Koch | G06F 9/45558 718/1 |
| 9,253,260 B1 | 2/2016 | Bailey et al. | |
| 9,311,001 B1 * | 4/2016 | Glade | G06F 3/0665 |
| 9,383,737 B2 | 7/2016 | Fonts Zaragoza et al. | |
| 9,477,239 B2 | 10/2016 | Bergman et al. | |
| 9,612,585 B2 | 4/2017 | Aggarwal et al. | |
| 9,762,445 B2 | 9/2017 | Coleman et al. | |
| 10,054,919 B2 | 8/2018 | Westrick et al. | |
| 10,419,243 B2 * | 9/2019 | Schubert | H04L 12/2832 |
| 10,768,862 B2 * | 9/2020 | Franke | G06F 3/0622 |
| 10,936,535 B2 * | 3/2021 | Franke | H04L 67/1097 |
| 10,965,619 B2 * | 3/2021 | Johnsen | H04L 49/10 |
| 11,057,244 B2 * | 7/2021 | Schubert | H04L 67/08 |
| 11,397,690 B2 * | 7/2022 | Lu | G06F 3/0664 |
| 11,637,720 B2 * | 4/2023 | Schubert | H04L 67/08 709/223 |
| 2004/0078471 A1 | 4/2004 | Yang | |
| 2004/0210348 A1 | 10/2004 | Imhof et al. | |
| 2005/0182498 A1 | 8/2005 | Landou et al. | |
| 2006/0212175 A1 | 9/2006 | Kim et al. | |
| 2007/0263644 A1 | 11/2007 | Christie et al. | |
| 2010/0115364 A1 | 5/2010 | Grohman | |
| 2011/0015799 A1 | 1/2011 | Pollack et al. | |
| 2011/0213867 A1 | 9/2011 | McCoy et al. | |
| 2011/0264276 A1 | 10/2011 | Kressner et al. | |
| 2013/0044763 A1 | 2/2013 | Koponen et al. | |
| 2013/0091267 A1 | 4/2013 | Urban et al. | |
| 2014/0064738 A1 | 3/2014 | Chen et al. | |
| 2014/0100854 A1 | 4/2014 | Chen et al. | |
| 2014/0118120 A1 | 5/2014 | Chen et al. | |
| 2014/0121786 A1 | 5/2014 | Chen et al. | |
| 2014/0129006 A1 | 5/2014 | Chen et al. | |
| 2014/0344427 A1 | 11/2014 | Coleman et al. | |
| 2015/0113052 A1 | 4/2015 | Chen et al. | |
| 2016/0134434 A1 | 5/2016 | Whiting et al. | |
| 2020/0322287 A1 * | 10/2020 | Connor | H04L 47/125 |

FOREIGN PATENT DOCUMENTS

| | | |
|---|---|---|
| CN | 101232470 A | 7/2008 |
| CN | 101563949 A | 10/2009 |
| CN | 101599952 A | 12/2009 |
| CN | 103354566 A | 10/2013 |
| CN | 104620186 A | 5/2015 |
| DE | 10245176 A1 | 4/2004 |
| EP | 1 703 684 A1 | 9/2006 |
| EP | 2 854 374 A1 | 4/2015 |

OTHER PUBLICATIONS

CN Office Action on CN Appl. Ser. No. 201710807656.8 dated Mar. 25, 2021 (10 pages).
EP Examination Report for European Application No. EP 17189292.0 dated Nov. 11, 2019 (6 pages).
Extended European Search Report for EP Appl. Ser. No. 17189292.0 dated Feb. 5, 2018 (10 pages).
JP Office Action on JP Appl. Ser. No. 2017-169307 dated Oct. 30, 2018 (8 pages).
CN Office Action with Search Report for CN Appl. Ser. No. 202111170916.8 dated Oct. 25, 2023 (33 pages).

* cited by examiner

| 3CI Medical Center | | |
|---|---|---|
| Administration ∨ | Floor 1 • ○ ○ | 🔍 |
| Floor 1 | | |
| Room 101 | EQUIPMENT SERVING SPACE | |
| Room 102 | | |
| Room 103 | POTENTIAL PROBLEM AREAS | FILTER ▼ |
| Room 104 | Data Generated 22m ago | ◄ ━━ ■ ► |
| Room 105 | ITEM \| VALUE \| EQUIPMENT \| SPACE(S) | |
| Room 106 | ■ ZONE TEMPERATURE — HIGH ALARM 87.5 deg F | |
| | ■ ZONE TEMPERATURE — LOW WARNING 72.5 deg F | |
| | ■ ZONE TEMPERATURE — BELOW SETPOINT 73.3 deg F | |
| | - ZONE — BELOW SETPOINT | |

EQUIPMENT SUMMARY

| VRF Units & Spaces | | Important Data For Each VRF Unit At A Glance | | | |
|---|---|---|---|---|---|
| EQUIPMENT | SPACE(S) | ZN-T | ZNT SP | OP MODE | VRF Indoor Units SF: C |
| ⚠ | | | | | |
| ⚠ | | 88.5 deg F | | | |
| | | | | | |
| ⚠ | | | 73.5 deg F | | |

SMART GATEWAY DEVICES, SYSTEMS AND METHODS FOR PROVIDING COMMUNICATION BETWEEN HVAC SYSTEM NETWORKS

CROSS-REFERENCE TO RELATED PATENT APPLICATIONS

This application is a continuation of U.S. patent application Ser. No. 17/365,124, filed Jul. 1, 2021, which is a continuation of U.S. patent application Ser. No. 16/531,249, filed Aug. 5, 2019, and granted as U.S. Pat. No. 11,057,244 Jul. 6, 2021, which is a continuation of U.S. patent application Ser. No. 15/261,843, filed Sep. 9, 2016, and granted as U.S. Pat. No. 10,419,243 Sep. 17, 2019. The entire disclosures of each of these patent applications and patent are incorporated by reference herein.

BACKGROUND

The present disclosure relates generally to building management systems. The present disclosure relates more particularly to systems and methods for presenting data, and changes to data, associated with a building management systems (BMS).

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include a variety of devices (e.g., HVAC devices, controllers, chillers, fans, sensors, etc.) configured to facilitate monitoring and controlling the building space. Throughout this disclosure, such devices are referred to as BMS devices or building equipment.

Currently, many building management systems provide control of an entire facility, building, or other environment. In some instances, portions of the BMS may not easily interface with the BMS. For example, where some of the BMS devices are provided by third-parties, the third party devices may communicate via proprietary communication protocols, which may be incompatible with the general BMS system. In some instances, this inability to communicate with the BMS using a communication protocol used by the BMS can increase time to commission, maintain, or monitor. For example, a technician may be required to "plug in" to the third party communication network to access devices on the third party network. In some instances, this can require expensive software and/or hardware to interface with the third party communication network.

Furthermore, in modern BMS systems a large number of devices and data points are required. In instances where devices or sub-systems within the BMS use a third-party communication network that is not compatible with the BMS network, these devices and data points may require additional software to be monitored and controlled within the BMS. In some examples, users may develop costly and/or complex software interface to communicate with the third party communication network. In some examples, the third party may provide for interface devices for communicating with the BMS network. However, these devices often provide limited functionality and may require detailed and time-consuming set up to properly function with the BMS. Thus, systems and methods for providing an easy interface between a BMS network and a non-BMS network is desirous.

SUMMARY

One implementation of the present disclosure is smart gateway device for providing communications between multiple networks associated with a building management system (BMS). The device includes a first network interface circuit in communication with a first network associated with a BMS. The device further includes a second network interface circuit in communication with a second network associated with a subsystem of the BMS, wherein the second network is not compatible with the first network. The second network interface circuit is configured to detect a physical device associated with the second network, and to receive a data packet associated with the physical device. The data packet is transmitted to the first network interface circuit. The first network interface circuit is configured to receive the data packet and to generate a virtual device based on the received data packet. The virtual device is configured to represent the physical device on the first network.

A further implementation of the present disclosure is a method for integrating devices on a standalone network into a building management system (BMS) network using a gateway device. The method includes discovering a physical device on the standalone network using a first integration circuit of the gateway device. The first integration circuit is in communication with the standalone network. The method further includes generating a virtual device using the first integration circuit. The virtual device includes a data structure associated with the physical device. The method additionally includes polling the discovered device using the first integration circuit to obtain data values associated with one or more data points of the physical device. The method also includes updating the data structure with the obtained data values, and exposing the virtual device to the BMS network using the second network interface circuit.

A further implementation of the present disclosure is a building management system. The system includes a first network comprising one or more devices associated with the first network, and a second network comprising one or more devices associated with the second network. The system further includes a gateway device. The gateway device configured to provide an interface between the first network and the second network such that the devices associated with the second network can be in communication with the first network.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 13 is a screenshot illustrating an exemplary dashboard of a building automation system, according to some embodiments.

DETAILED DESCRIPTION

Building Management System and HVAC System

Figure 1:
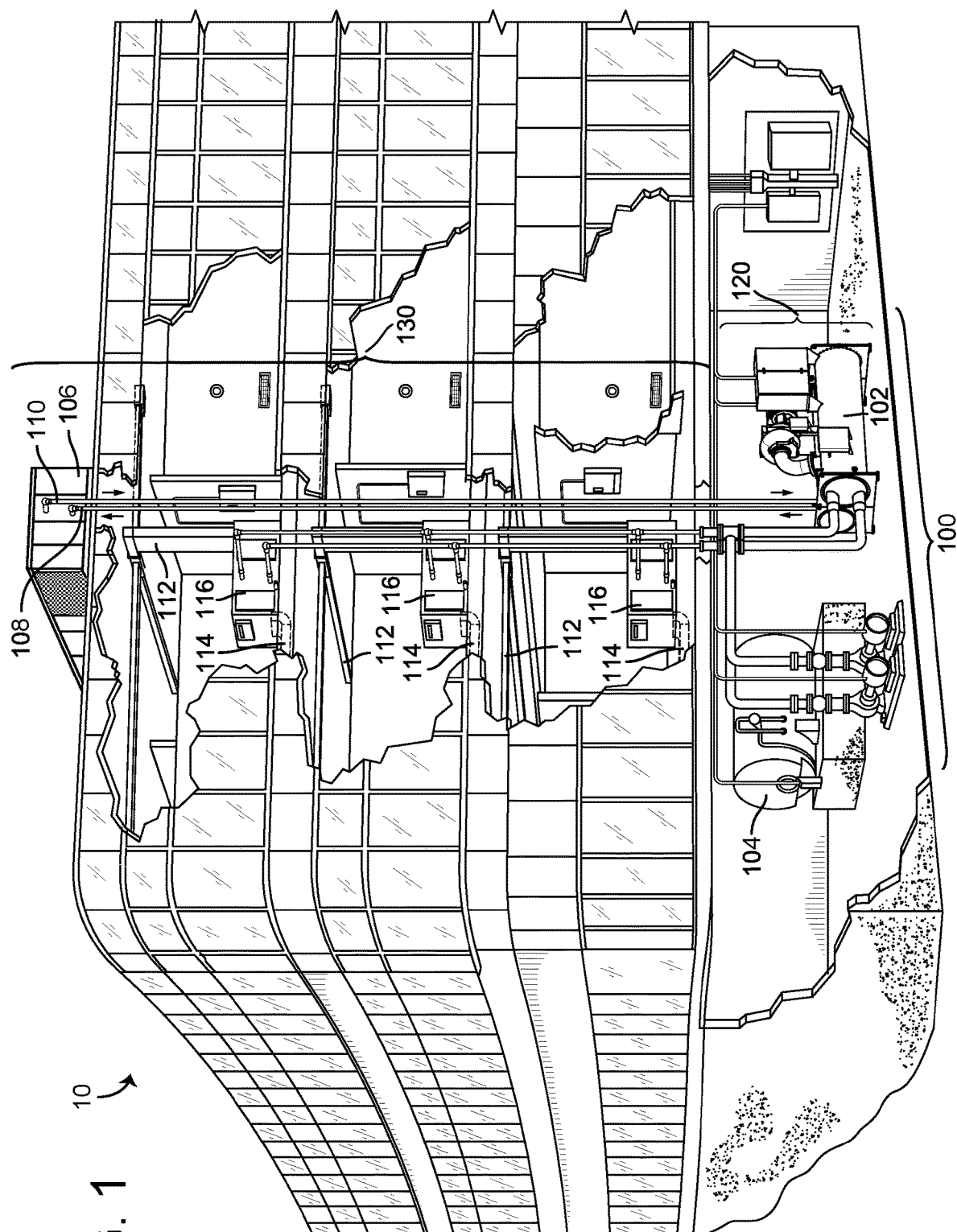
FIG. 1 is a drawing of a building equipped with a building management system (BMS) and a HVAC system, according to some embodiments.

Referring now to FIGS. 1-4, an exemplary building management system (BMS) and HVAC system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
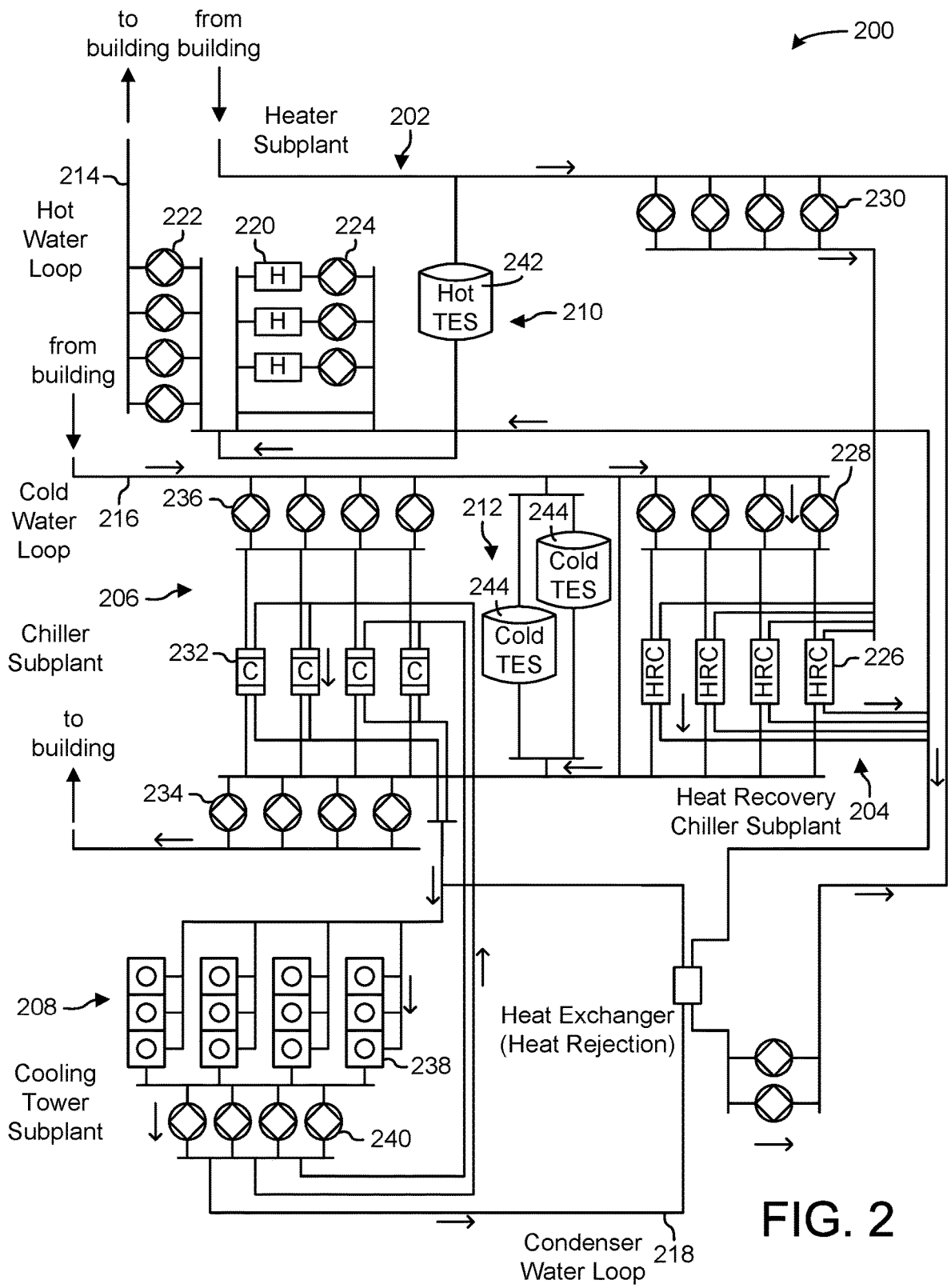
FIG. 2 is a schematic of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
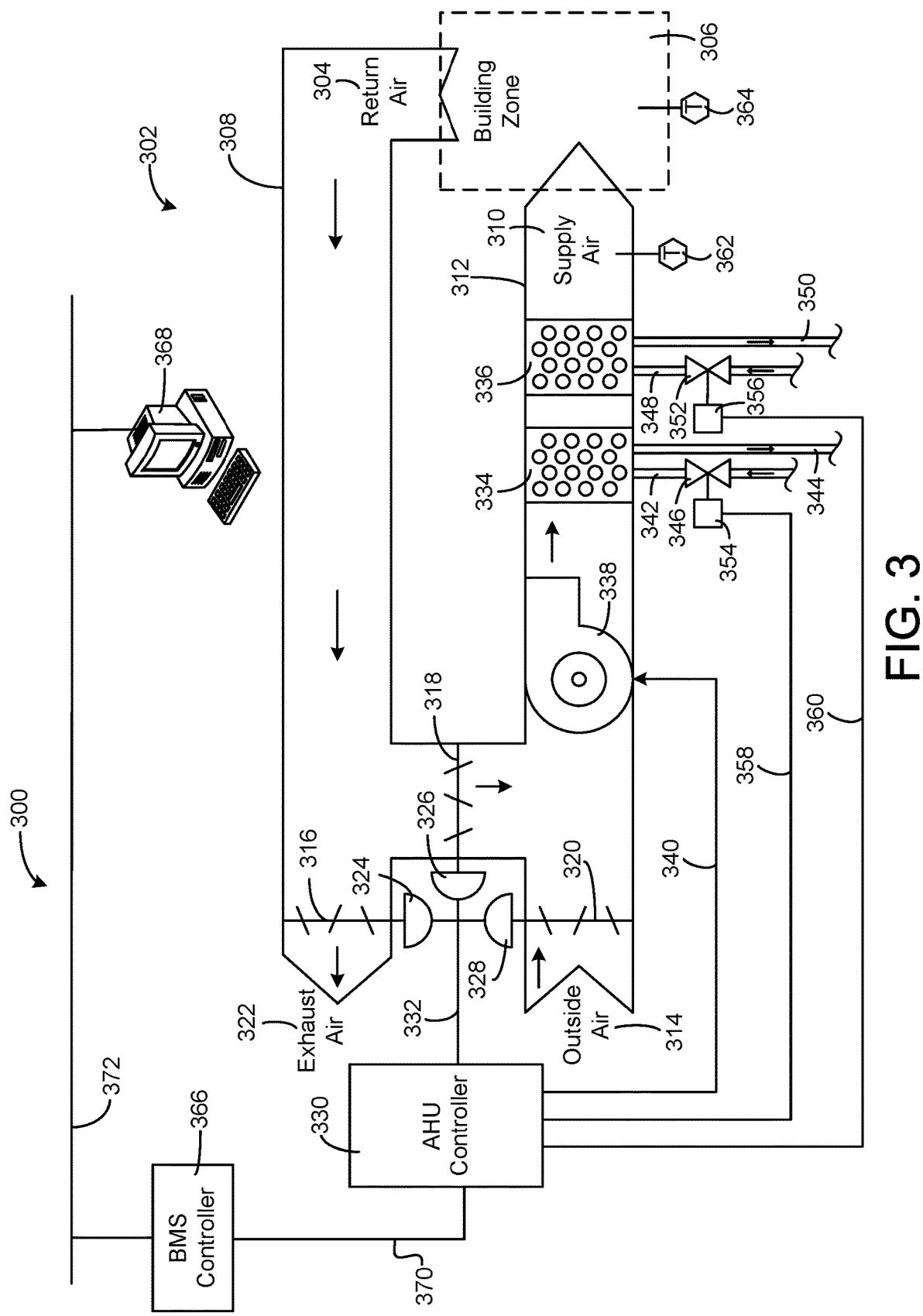
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
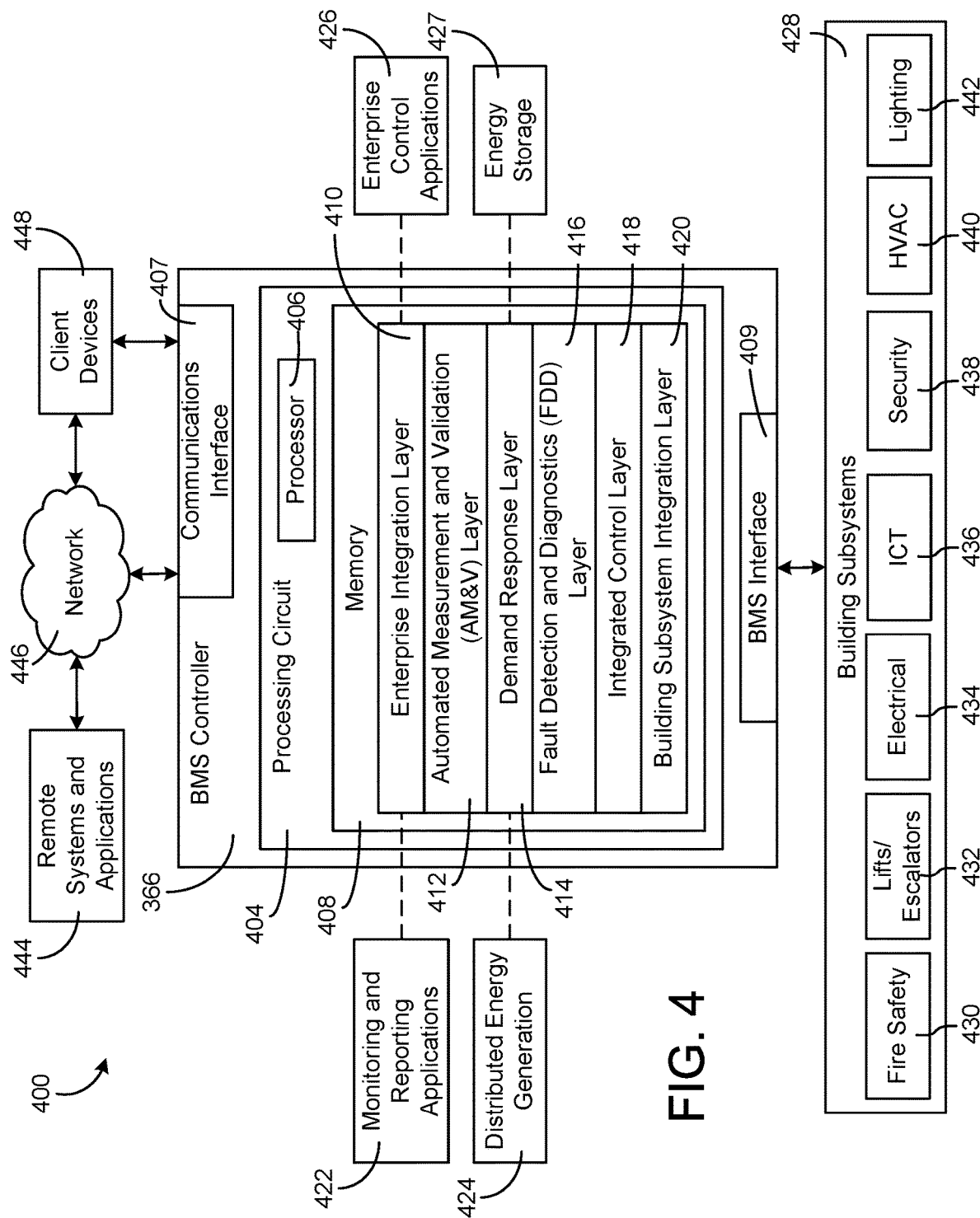
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its set-point. These processes can be examined by FDD layer 416 to expose when the system begins to degrade in performance and alert a user to repair the fault before it becomes more severe.

Smart Gateway

The BMS, as described above, operates over a network associated with the BMS. In some instances, other networks may be used in a BMS which are not compatible with the BMS network. Generally, an interface device may be used to provide some amount of interface between the BMS network and the other networks. As described below, a smart gateway device can interface between the BMS network and the other network to provide access to the other network by the BMS network, and vice versa. The smart gateway may create one or more virtualized devices associated with one or more devices on the other network. The virtualized devices within the smart gateway can be configured to appear as devices associated with the BMS network such that a controller or other device on the BMS simply interacts with the virtual devices without requiring additional programming or configurations.

Figure 5:
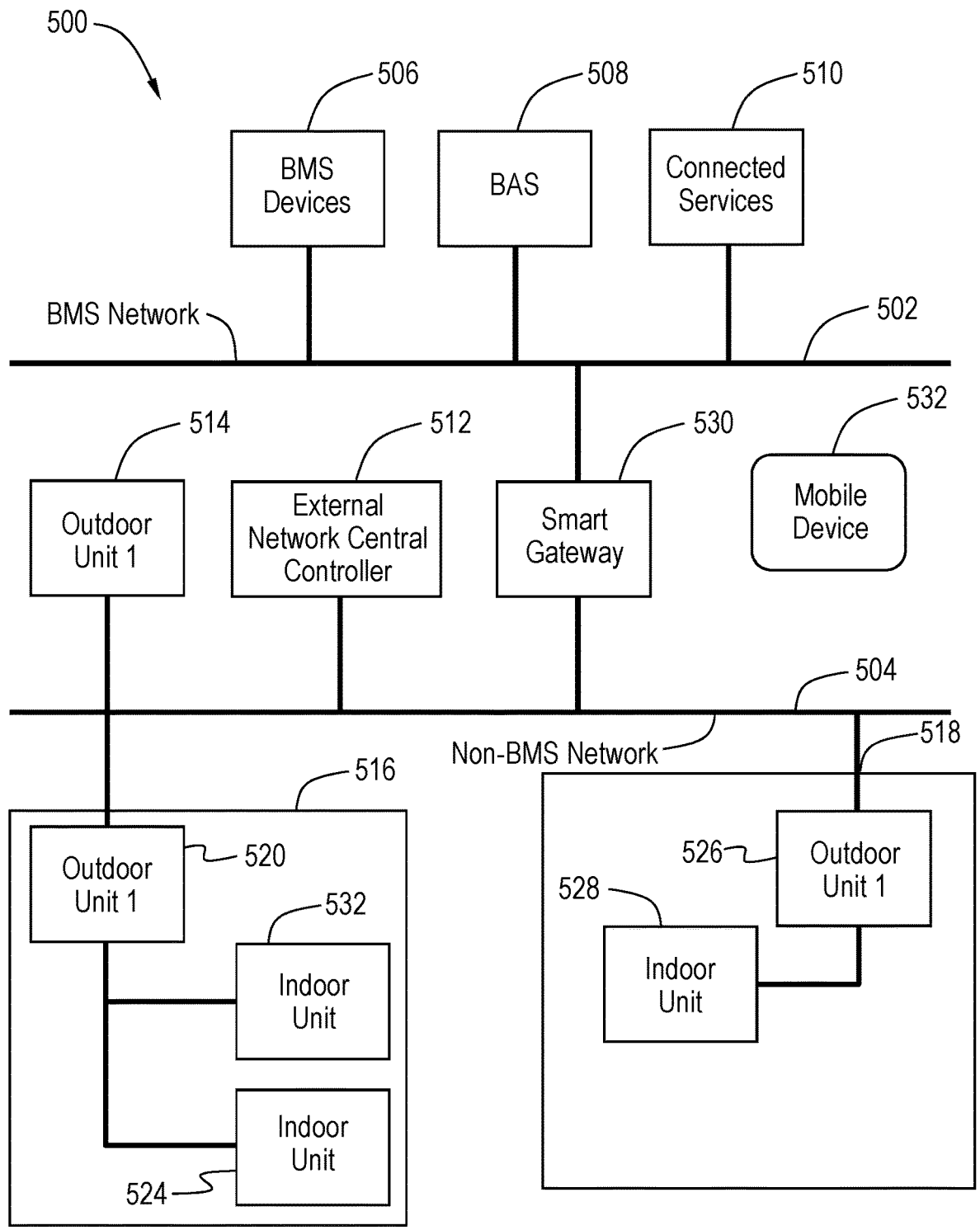
FIG. 5 is a system view illustrating a building management system in communication with a non-BMS subsystem via a smart gateway, according to some embodiments.

Turning to FIG. 5, an exemplary building management system ("BMS") 500 is shown having a BMS network 502 and a non-BMS network 504. The BMS network 502 may serve multiple devices and/or systems. For example, the BMS network 502 may provide communication between one or more BMS devices 506, a building automation system ("BAS") 508 and/or connected services 510. In one embodiment, the BMS network 502 may be a Building Automation Control Network ("BACnet"). The BMS network 502 may further be a Master Slave Token Passing (MSTP) BACnet network, a BACnetIP network, or a combination of the two. In further examples, the BMS network 502 may be any other applicable network, such as a local area network (LAN), a wireless local area network (WLAN), an EthernetIP network, or any other applicable network for controlling a building management system.

The BMS devices 506 may be any of the BMS devices described above, and/or any devices required within the BMS 500. Example devices may include AHUs, VAVs, RTUs, controllers, actuators, chillers, sensors, security devices, etc. The BMS devices 506 are able to communicate with the BMS network 502, and thereby the BAS 508 and/or connected services 510. The BAS may be a central controller or operating system. For example, the BAS may be a Metasys Building Automation System from Johnson Controls. In other examples, the BAS 508 is a Verasys Building Automation System from Johnson Controls. However, other types of building automation systems are contemplated. The BAS 508 can provide intelligence, control, and monitoring across the BMS 500. The connected services 510 may include one or more cloud-based services that can be accessed via the BMS network 502. Example connected services 510 may include data analysis programs, cloud-based knowledgebases, or other services. In some embodiments, the connected services 510 may include services allowing for a user to remotely access and interface the BAS 508 and/or the BMS 500.

The non-BMS network 504, may provide communication between one or more non-BMS systems or devices. As used herein, the term "non-BMS" system or device is used to describe devices that do not natively communicate with the BMS 500 via the BMS network 502. Non-BMS devices and/or systems therefore require additional devices or software to interface with the BMS network. In one example, the non-BMS network 504 may provide communications between an external network central controller 512, one or more outdoor units 514, a first third party system sub-system 516, and a second third party sub-system 518. In one embodiment, the first third-party sub-system 516 and the second third-party sub-system 518 are refrigeration systems. However, the first third-party sub-system 516 and the second third-party sub-system 518 may be other types of sub-systems, such as chiller systems, HVAC system, AHU's, VAV's, security systems, or other system associated with a building management system. As shown in FIG. 5, the first third-party sub-system 516 includes an outdoor unit 520, and two indoor units 522, 524. The outdoor unit may be an outdoor refrigeration unit. The indoor units 522, 524 may be indoor refrigeration units, such as blowers, fan coils and/or air-conditioning units. Similarly, the second third party system 518 may include an outdoor unit 526 and one or more indoor units 528.

In some embodiments, the non-BMS network 504 may be a proprietary networks associated with the thirty-party devices and systems. For example, metering systems, refrigeration systems, fire safety and/or suppression systems, and/or lighting systems may utilize proprietary or restricted protocols to communicate between devices within the systems. In other examples, the non-BMS network 504 may be associated with a commonly used communication protocol that is distinct from that being used for the BMS network 502. For example, the non-BMS network 504 may utilize a KNX protocol, a Modbus protocol, a Controlbus protocol, a CAN protocol, or other applicable protocol.

The BMS 500 is further shown to include a smart gateway 530. The smart gateway 530 is configured to provide an interface between the BMS network 502 and the non-BMS network 504. For example, the smart gateway 530 may convert data transmitted over the non-BMS network 504 into a compatible network protocol, such as BACnet, for use with the BMS network. The smart gateway 530 will be described in further detail below. In one embodiment, the smart gateway can read and write data to both the BMS network 502 and the non-BMS network 504. In some examples, the smart gateway 500 may further have a wireless radio for communicating with one or more user devices, such as mobile device 532. In some embodiments, a user accesses the smart gateway 530 via a mobile device 532, allowing the user access to the non-BMS network 504 and/or the BMS network 502. In one embodiment, the smart gateway 530 communicates with the mobile device via Wi-Fi. However, in other examples, wireless protocols such as Bluetooth, LoRA, cellular (3G, 4G, LTE, CDMA), Wi-Max, NFC, Zigbee, or other applicable protocols may be used to communicate with the mobile device 532. In other examples, the smart gateway 530 may communicate with the mobile device 532 using a wired communication protocol, such as Universal Serial Bus (USB) 2.0 or 3.0, RS-232, RS-485, Firewire, or other applicable wired communication protocols.

Figure 6:
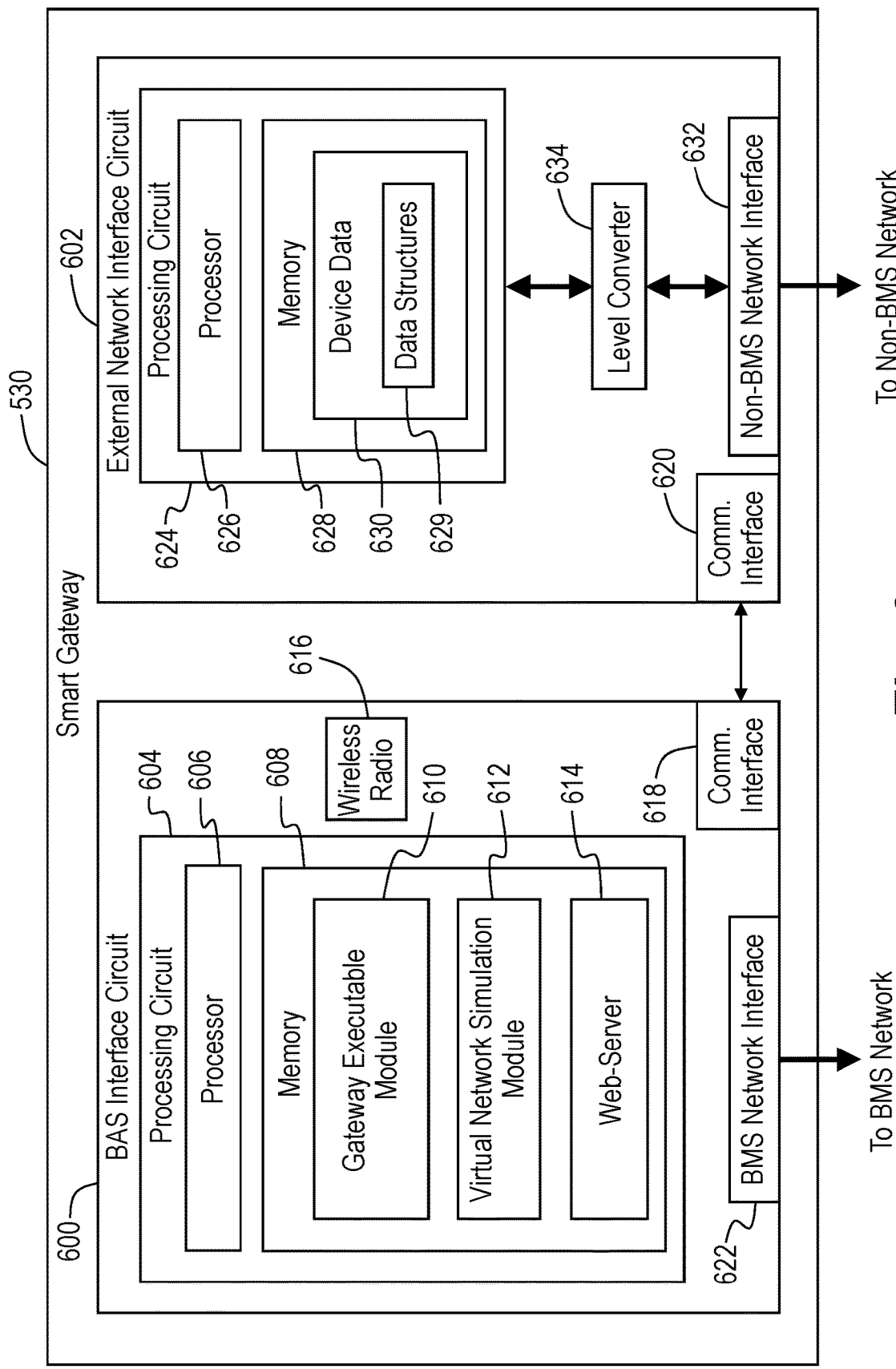
FIG. 6 is a schematic view illustrating a smart gateway device of FIG. 5, according to some embodiments.

Turning now to FIG. 6, a schematic view illustrating the smart gateway 530 of FIG. 5 is shown, according to some embodiments. The smart gateway 530 includes a BMS interface circuit 600 and an external network interface circuit 602. The BMS interface circuit includes a processing circuit 604. The processing circuit 604 includes a processor 606 and a memory 608. The processor 606 may be a general purpose or specific purpose processor, an application specific integrated circuit (ASIC), one or more field programmable gate arrays (FPGAs), a group of processing components, or other suitable processing components. The processor 606 may be configured to execute computer code or instructions stored in the memory 608 or received from other computer readable media (e.g., CDROM, network storage, a remote server, etc.).

The memory 608 may include one or more devices (e.g., memory units, memory devices, storage devices, etc.) for storing data and/or computer code for completing and/or facilitating the various processes described in the present disclosure. The memory 608 may include random access memory (RAM), read-only memory (ROM), hard drive storage, temporary storage, non-volatile memory, flash memory, optical memory, or any other suitable memory for storing software objects and/or computer instructions. The memory 608 may include database components, object code components, script components, or any other type of information structure for supporting the various activities and information structures described in the present disclosure. The memory 608 may be communicably connected to the processor 606 via processing circuit 604 and may include computer code for executing (e.g., by processor 606) one or more processes described herein.

The memory 608 is shown to include a gateway executable module 610, a virtual network simulation module 612, and a webserver 614. The gateway executable module 610 includes the software modules required for operating the non-virtualized portion of the smart gateway 530. The gateway executable module 610 will be described in more detail below. The virtual network simulation module 612 includes the software modules required for operating the virtualized portion of the smart gateway 530, and will be described in more detail below.

The webserver 614 is configured to process and deliver web pages to a user. In one embodiment, the webserver 614 may be an HTTP webserver. The webserver 614 may be configured to deliver images, such as HTML documents to a user via the mobile device 532. The webserver 614 may support server-side scripting, Active Server Pages, or other scripting languages. The webserver 614 may further be configured to provide information or generate web-pages to devices in a local network. For example, the webserver 614 may be configured to provide web-pages to devices which are connected directly to the smart gateway 530, such as via wireless radio 616. In some embodiments, the webserver 614 can provide a web-portal for a user to access the smart gateway 530. In some embodiments, the user can access the smart gateway 530 via mobile device 532 by accessing the web-portal (e.g. website) generated by the webserver 614. In some embodiments, the web-portal provides basic information associated with the smart gateway 530, such as configuration data, network data, status, errors, etc. In further embodiments, the web-portal may allow the user to fully configure the smart gateway 530 via the mobile device 532. For example, the user may be able to connect the smart gateway 530 to both the BMS network 502 and the non-BMS network 504 via the web-portal. In still further embodiments, the user may be able to configure the one or more devices associated with the non-BMS network 504 via the web-portal. This can allow a user to quickly and easily configure the smart gateway 530 such to provide the interface between the BMS network 502 and the non-BMS network 504.

In one embodiment, the BMS interface circuit 600 includes a wireless radio. In one embodiment, the wireless radio 616 is a Wi-Fi radio. The Wi-Fi radio can be configured to utilize service set identifier ("SSID") technology. SSID technology can be used such that only devices with specific access to the SSID associated with the smart gateway 530 will be allowed to access the data associated with the smart gateway 530 via the webserver 614. In other embodiments, the wireless radio 616 can be configured to utilize other security layers to restrict access to the smart gateway 530. For example, a user attempting to access the smart gateway 530 via the wireless radio 616 may be required to provide a user name and password before being allowed access. In still further examples, the user may be required to maintain an identity token on the mobile device used to access the smart gateway 530 via the wireless radio 616, such that the user is required to present the token to the smart gateway 530 to obtain access. While the wireless radio 616 is described above to relate to a Wi-Fi radio, the wireless radio 616 may utilize other wireless communication protocols such as Wi-Max, Zigbee, LoRA, Bluetooth, NFC, cellular (3G, 4G, LTE, CDMA), RF, IR, or other applicable wireless communication protocols.

The BMS interface circuit 600 further includes a communication interface 618. The communication interface 618 is configured to communicate with a second communication interface 620 located on the external network interface circuit 602. In one embodiment, the communication interfaces 618, 620 are serial communication interfaces, such as USB. In other examples, the communication interfaces 618, 620 may be other types of serial interfaces such as RS-232, RS-485, or other applicable serial communication types. The BMS interface circuit 600 may further include a BMS network interface 622. The BMS network interface 622 can provide communication to and from the BMS network 502. For example, the BMS network interface 622 may be a BACnet interface. However, the BMS network interface 622 is contemplated to be configured to interface with other types of BMS networks as well.

The external network interface circuit 602 can also include a processing circuit 624. The processing circuit is in communication with the communication interface 620 for communicating with the BMS interface circuit 600. The processing circuit 624 includes a processor 626 and a memory 628. The processor 626 may be a general purpose or specific purpose processor, an application specific integrated circuit (ASIC), one or more field programmable gate arrays (FPGAs), a group of processing components, or other suitable processing components. The processor 626 may be configured to execute computer code or instructions stored in the memory 628 or received from other computer readable media (e.g., CDROM, network storage, a remote server, etc.). In some embodiments, processing circuits 604 and 624 can be the same processing circuit.

The memory 628 may include one or more devices (e.g., memory units, memory devices, storage devices, etc.) for storing data and/or computer code for completing and/or facilitating the various processes described in the present disclosure. The memory 628 may include random access memory (RAM), read-only memory (ROM), hard drive storage, temporary storage, non-volatile memory, flash memory, optical memory, or any other suitable memory for storing software objects and/or computer instructions. The memory 628 may include database components, object code components, script components, or any other type of information structure for supporting the various activities and information structures described in the present disclosure. The memory 628 may be communicably connected to the processor 626 via processing circuit 624 and may include computer code for executing (e.g., by processor 626) one or more processes described herein.

The memory 628 may include a device data module 630. The device data module 630 may be used to store data related to devices associated with the non-BMS network 504. Example data may include data points, device address, device names, device types, device status, data point values, etc. In one embodiment, the external network interface circuit 602 is configured to interface with the non-BMS network 504. The external network interface circuit 602 may interface with the non-BMS network 504 via a non-BMS network communication interface 632. In some embodiments, the external network interface circuit 602 may further include a level converter 634. The level converter 634 may be required where the signal levels on the non-BMS network 504 are not compatible with the processing circuit 624. In some embodiments, the level converter 634 is integral to the non-BMS communication interface. In examples where the external network interface circuit 602 has a level converter 634, the level converter 634 provides communication between the processing circuit 624 and the non-BMS communication interface 632. In other embodiments where the level converter 634 is not required, the processing circuit 624 interacts directly with the non-BMS communication interface 632 to access the non-BMS network 504.

Figure 7:
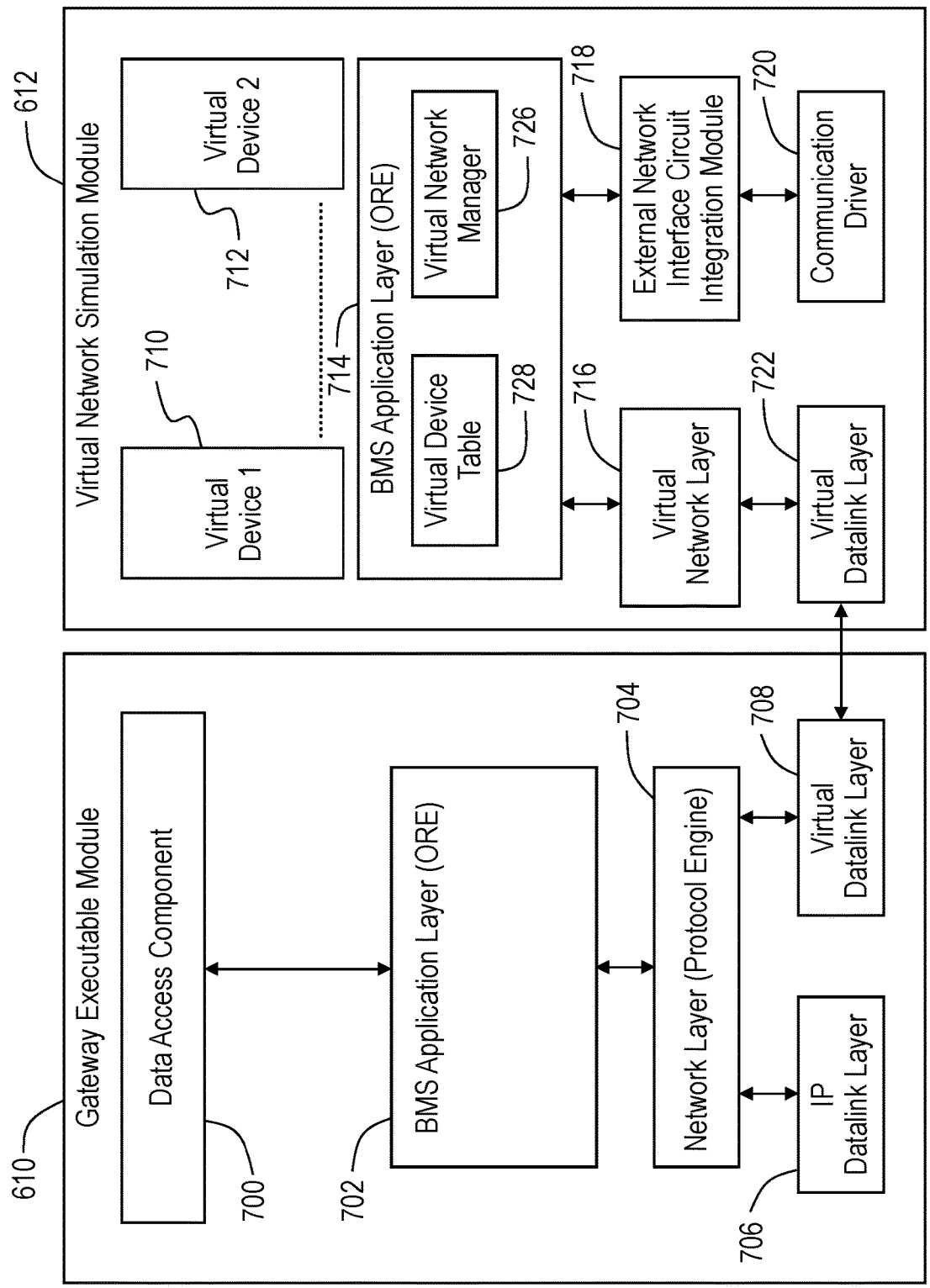
FIG. 7 is an interface diagram illustrating the interaction between the gateway executable module and the virtual network simulation module of FIG. 6, according to some embodiments.

Turning now to FIG. 7 an interface diagram showing the interaction between the gateway executable module 610 and the virtual network simulation module 612 of the BMS interface circuit is shown, according to some embodiments. As shown in FIG. 7, the gateway executable module 610 can include a data access component 700, a BMS application layer 702, a network layer 704, an IP datalink layer 706 and a virtual datalink layer 708. The virtual simulation module 612 is shown to include a first virtual device 710 and a second virtual device 712. While only two virtual devices 710, 712 are shown, it is contemplated that multiple virtual devices may be located within the virtual simulation module 612. In one embodiment, the virtual simulation module 612 may include up to two-hundred virtual devices. However, in other embodiments, the virtual network simulation module 612 may include more than two-hundred virtual devices or less than two-hundred virtual devices. The virtual network simulation module 612 may further include a BMS application layer 714, a network layer 716, an external network interface circuit integration module 718, a communication driver 720, and a virtual datalink layer 722.

The data access component 700 of the gateway executable module 610 is configured to access data within the virtual devices 710, 712 in the virtual network simulation module 612. In one embodiment, the data access component 700 is configured to store one or more poll mappers, the poll mappers configured to poll the virtual devices 710, 712 to obtain the required data. The data access component 700 may further be configured to communicate the data from the virtual devices 710, 712 to the BAS application layer 702. In one example, the data access component 700 is a Multi-Touch Gateway UI Data Access Component. In other embodiments, the data access component 700 is a Mobile Access Portal. However, other data access component types are contemplated as well. In some embodiments, the data access component is configured to interface with the one or more virtual devices 710, 712.

The BMS application layer 702 may be configured to convert data received from the data access component 700 into data readable by the devices associated with the BMS network 502. The network layer 704 may convert the data from the virtual devices 710, 712 into a format for use on the BMS network 502. Where the BMS network 502 is a BACnet network, the network layer 704 may map the data from the virtual devices 710, 712 into one or more device objects as BACnet readable data objects. The BACnet data objects may then be configured such that they are readable and/or writable by devices associated with the BMS network 502. Further, the network layer 704 may be configured to map data received from the BMS network 502 into the one or more virtual devices 710, 712. The data mapped to the one or more virtual devices 710, 712 can then passed on to the associated non-BMS devices.

The network layer 704 can modify the data stored in the one or more virtual devices 710, 712 to be presented over a network. In one embodiment, the network layer 704 modifies the data stored in the virtual devices 710, 712 for transmission over a BMS network using a BACnet protocol. However, other network protocols other than BACnet protocols are also contemplated. Similarly, the network layer 704 can convert data received via a network into data that can be mapped to the one or more virtual devices 710, 712. The IP datalink layer 706 is configured to access an IP based network. For example, where the BMS network 502 is BACnet IP, the IP datalink layer may package and transmit the data modified by the network layer 704 over the BACnet IP network. In other examples, the IP datalink layer 706 may be used where the BMS network 502 is any type of IP based network. The virtual datalink layer 708 may be configured to receive and transmit data to the virtual network simulation module 612. In one embodiment, the virtual datalink layer 708 communicates with the virtual network simulation module 612 via the virtual data link layer 722.

The virtual network simulation module 612 may communicate with the non-BMS network 504 via the communication driver 720. In one embodiment, the communication driver is a USB driver for communicating with the external network interface circuit 602. In other examples, the communication driver 720 may be other types of serial data drivers, such as RS-232, RS-485, etc. In some examples, the communication driver 720 may be a proprietary serial communication driver such as an H-Link communication driver from Hitachi. In some embodiments, the communication driver 720 can be in communication with the communication interface 618 for communicating with the communication interface 620 of the external network interface circuit 602. The communication driver 720 is further in communication with the external network interface circuit integration module 718. The external network interface circuit integration module 718 is configured to translate the data from the external network interface circuit 602, for use in the virtual network simulation module 612. For example, the external network interface circuit integration module 718 may be configured to parse the data received via the communication driver 720 into individual data points. The external network interface circuit integration module 718 may parse the received data by data type, device type, device address, etc. The external network interface circuit integration module 718 can then provide the parsed data to the virtual BMS application layer 714.

The virtual BMS application layer 714 may include a virtual network manager 726. In one embodiment, the virtual network manager 726 is responsible for creation and management of virtual devices 710, 712, as well as read and write operations to and from the virtual devices 710, 712. The virtual network manager 726 may be configured to create a virtual network based on the data received from the external network interface circuit integration module 718. For example, if the external network interface circuit integration module 718 provides data from multiple non-BMS devices or systems, the virtual network manager can create virtual devices associated with the received data. For example, the virtual devices 710, 712 may be created by the virtual network manager 726, as will be described in more detail below. The virtual BMS application layer 714 can further take the data provided by the external network interface circuit integration module 718 and, working with the virtual network manager 726, modify the received data to be compatible with BMS network 502. For example, by populating the virtual devices 710, 712 with data objects, the virtual devices 710, 712 can be read by the network layer 704 as individual devices, similar to BMS devices on the BMS network 502. An example virtual device is illustrated in FIG. 8, discussed in detail below.

In a further embodiment, the virtual BMS application layer 714 can be configured to map the received data into a virtual device table 728. In one embodiment, the virtual device table 728 may be populated with data related to one or more of virtual devices 710, 712. In one embodiment, the virtual device table 728 may be configured to represent a list of virtual BACnet objects; however other data object types are contemplated. In one embodiment, the virtual device table 728 is modified for each virtual device 710, 712 created by the virtual network manager 726. The virtual device table 728 may further provide mapping between the virtual devices 710, 712 and the associated non-BMS devices.

In one embodiment, the virtual network layer 716 is configured to modify the data stored in the one or more virtual devices 710, 712 to be presented over a network. In one embodiment, the virtual network layer 716 modifies the data stored in the virtual data objects for transmission over a BMS network using a BACnet protocol. However, other network protocols other than BACnet protocols are also contemplated. The virtual datalink layer 722 may be configured to receive and transmit data to the gateway executable module 610. In one embodiment, the virtual datalink layer 722 communicates with the gateway executable module 610 via the virtual data link layer 722.

Figure 8:
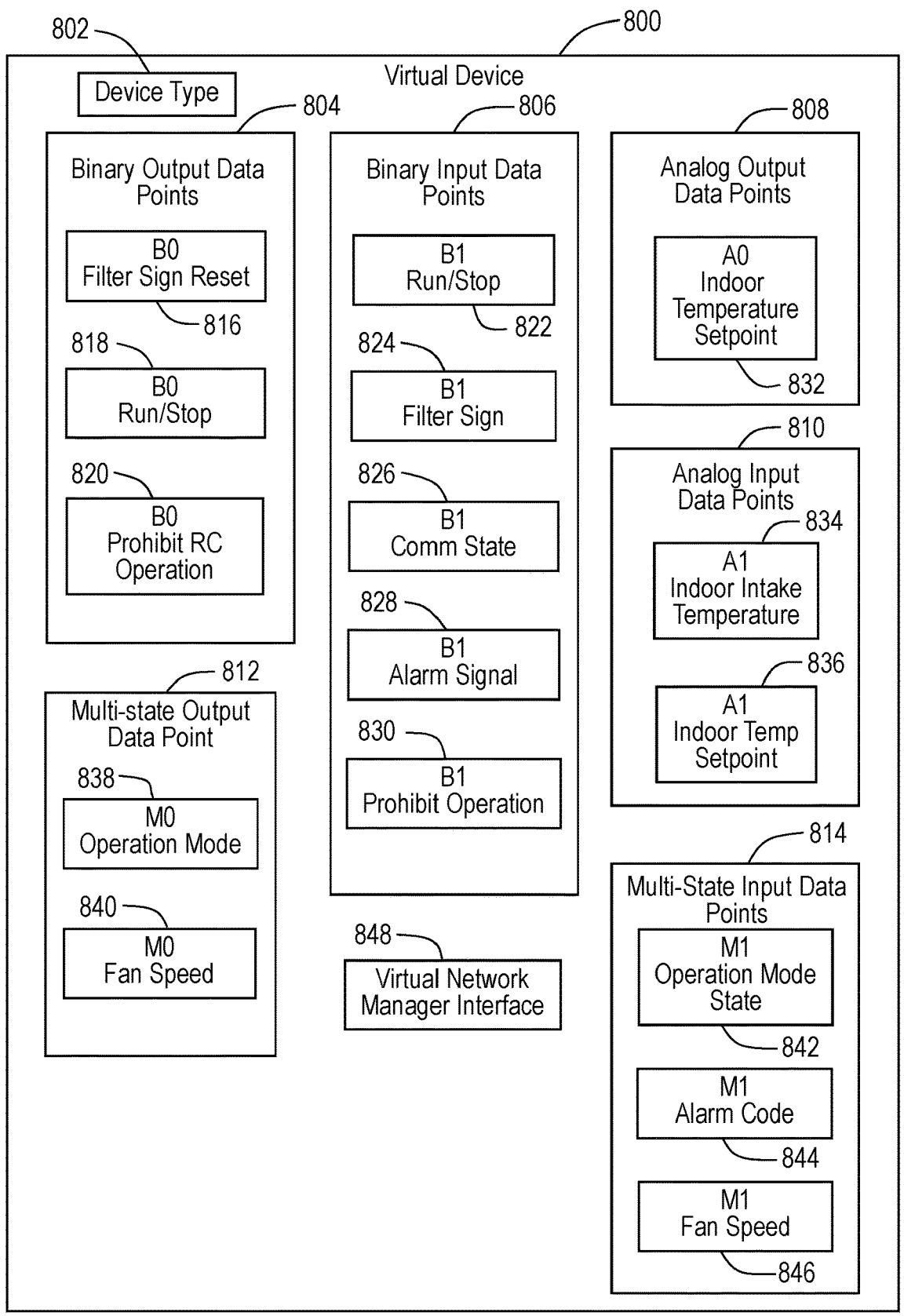
FIG. 8 is a detailed view of a virtual device, according to some embodiments.

Turning now to FIG. 8 a detailed view of a virtual device 800 is shown, according to some embodiments. The virtual device 800 may be similar to the virtual devices 710, 712 described above The virtual device 800 is configured to represent a non-BMS device as a BMS device to the BMS network. In one embodiment, the virtual device 800 is generated by the virtual network manager 726 based on data received via the non-BMS network 504 relating to non-BMS devices. The virtual device 800 includes a number of data points, the data points corresponding to actual data points on non-BMS devices or systems. In one embodiment, the virtual device 800 includes a device type data point 802. In some embodiments, the device type data point 802 may include basic data regarding the type of device the virtual device 800 is representing. For example, the device type data point 802 may indicate that the virtual device 800 represents an outdoor unit, an indoor unit, or a sub-system thereof. In other embodiments, the device type data point 802 may indicate that the virtual device 800 represents other HVAC or BMS devices. In further embodiments, the device type data point 802 indicates the exact type of device being represented. For example, the virtual device 800 may represent an outdoor refrigeration unit, an indoor refrigeration unit, an RTU, a VAV, a controller, or other applicable devices or systems.

The virtual device 800 may further include a number of data points. The data points may be binary output data points 804, binary input data points 806, analog output data points 808, analog input data points 810, multi-state outputs 812, and multi-state inputs 814. The above data points types are exemplary only, and it is contemplated that additional data points types may be associated with the virtual device. The binary output data points 804 may include binary output data points such as a filter sign reset 816, a run-stop signal 818, and a prohibit RC operation signal 820. The binary input data points 806 may include data points such as a run/stop input 822, a filter sign 824, a communication state 826, an alarm signal 828, and a prohibit operation input 830. The analog output data points 808 may include an indoor temperature setpoint output 832. The analog input data points 810 may include an indoor intake temperature input 834 and an indoor temperature setpoint 836. The multi-state output data points 812 may include an operation mode output 838 and a fan speed output 840. The multi-state input data points 814 may include data points such as an operation mode state input 842, an alarm code 844, and a fan speed input 846. It should be understood that the above described data points are exemplary only, and that multiple data points are contemplated.

The virtual device 800 may further include a virtual device manager 848. The virtual device manager 848 is configured to interface with the virtual network manager 726. The virtual device manager 848 can receive data point values, device type information, device status information, and other information related to an associated non-BMS device via the virtual network manager 726. In some embodiments, the virtual device manager 848 is configured to communicate values received via the data access component 700 to the virtual network manager 726 via the virtual network manager interface. The virtual network manager can then provide the new values to the associated non-BMS device. In a further embodiment, the virtual device manager 848 emulates multiple network devices based on devices listed the virtual device table 728. For example, a 'Who-Is' request shall be replied to with an 'I Am' from multiple network devices with unique virtual MAC addresses. 'Who-Is' and 'I am' commands are standard commands of a BACnet protocol. Further, the virtual device manager 848 can emulate the devices listed in the virtual device table as BACnet/IP devices.

Figure 9:
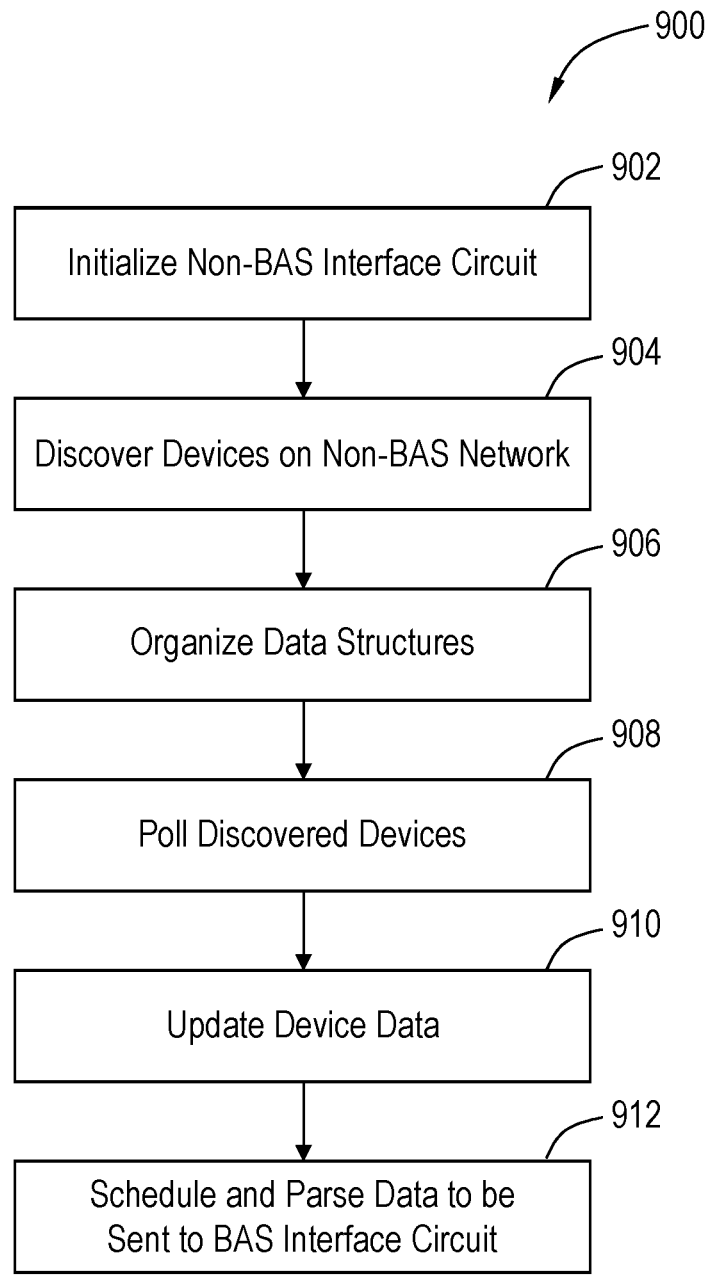
FIG. 9 is a flow chart illustrating a process for interfacing with a non-BMS network using a smart gateway device, according to some embodiments.

Turning now to FIG. 9, a process 900 for interfacing with a non-BMS network using the smart gateway 530 is shown, according to some embodiments. At process block 900, the external network interface circuit 602 is initialized. At process block 904, the external network interface circuit 602 communicates with the non-BMS network 504 to discover all devices and/or subsystems on the non-BMS network 504. In one example, the external network interface circuit 602 communicates with the non-BMS network 504 via the non-BMS communication interface 632. At process block 906, the data from the discovered devices is organized into data structures by the external network interface circuit 602.

In one embodiment, the data structures may be stored in one or more data tables, such as data structures 629, described above. In one embodiment, the data tables are stored in the device data module 630. The data tables may be configured to store data structures for each discovered non-BMS device. The data structures can be unique to each discovered device. In some embodiments, the data structures may be partially constructed by the processing circuit 624 of the external network interface circuit. For example, the data structures may be partially constructed based on the detected device type. By receiving the device type, a data structured can be constructed by the processing circuit 624 to reflect the usual message content received from the device. In some embodiments, the device data may include metadata identifying the current running state and any configuration settings required by the non-BMS device. The data structures may be formatted to provide for easier consumption by devices associated with the BMS network 502, such as BAS 508 and/or BMS devices 506. For example, the data structures may be formatted using standard device and point names as used in the BMS network 502. Additional examples may include common or standard graphics or other templates. This can reduce time required for installation and configuration of devices and subsystems associated with the non-BMS network 504. Further, by formatting the data structures to be compatible with the BMS network 502, non-intelligent devices (valves, actuators, etc.) can communicate with the BAS 508 via a common data model. The common data model may include intelligence that allows one or more controllers or other BMS devices 506 to recognize or identify non-BMS devices or subsystems with minimal effort.

At process block 908, the discovered devices can be polled to obtain values for one or more data points associated with the discovered devices. In one embodiment, the external network interface circuit 602 performs the polling. In one embodiment, the polling may be conducted immediately upon the data structures being set up at process block 906. In other embodiments, the polling may be conducted at regular intervals to ensure that the device data is current. Once the discovered devices have been polled, the device data structures are updated at process block 910. At process block 912, the external network interface circuit 602 can schedule and parse the data to be sent to the BMS interface circuit.

Figure 10:
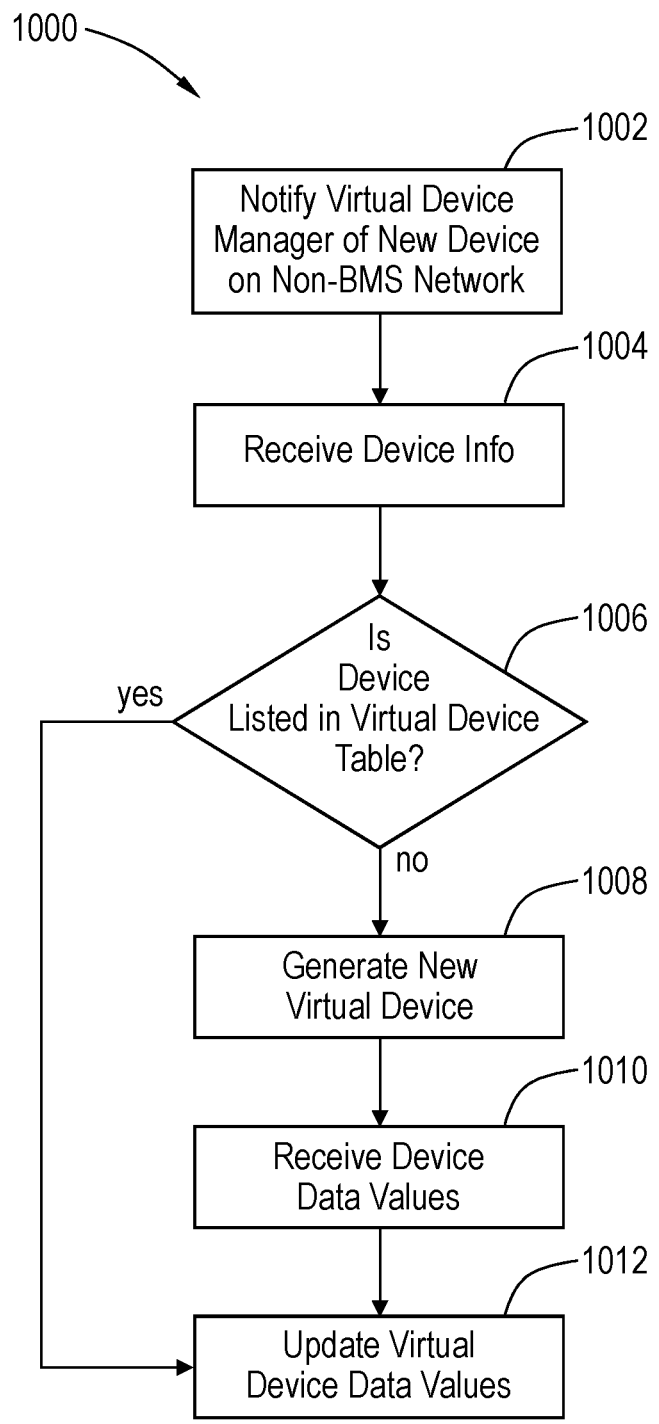
FIG. 10 is a flow chart illustrating a process for generating one or more virtual devices, according to some embodiments.

Turning now to FIG. 10, a process 1000 for generating one or more virtual devices is shown, according to some embodiments. At process block 1002, the virtual network manager 726 is notified that a device has been detected on the non-BMS network 504. In one embodiment, the notification is performed by the external network interface circuit 602. In one example, the notification may be in the form of a data packet sent to the virtual network manager 726. In some embodiments, the indication may include an address and/or device type of the newly discovered device. Once the notification has been provided to the virtual network manager 726, data associated with the new device can be provided to the virtual network manager 726. In one embodiment, the data is provided by the external network interface circuit. The data may contain a unique MAC address associated with the device. Further, the received data may include information related to the device type. For example, the information related to the device type may indicate whether the unit is an indoor unit or an outdoor unit. In other embodiments, the unique MAC address may be associated with the type of device. For example, the prefix or suffix of the MAC address may be associated with specific device types.

At process block 1006, a the virtual network manager 726 determines if the device is currently listed in the virtual device table 728. In one embodiment, the virtual network manager 726 determines if the received unique MAC address is currently listed in the virtual device table 728. However, in other embodiments, the virtual network manager 726 may evaluate other criteria to determine if the device is listed in the virtual device table 728. If the device is not currently listed in the virtual device table 728, the virtual network manager 726 will generate a new virtual device at process block 1008. In one embodiment, the virtual network manager 726 may generate the virtual device based on the type of device associated with the device type. In other embodiments, the virtual network manager 726 may generate the virtual device based on the unique MAC address of the device. In some examples, the virtual network manager 726 may have access to a database having data points provided by different data types. The virtual network manager 726 can then utilize the database to generate virtual devices having the proper data points and/or other parameters. In some embodiments, the virtual network manager 726 may initial set up the virtual device as an "offline" device. The virtual device may remain as an offline device until additional data is received.

At process block 1010, data value changes can be received by the virtual network manager 726. In some embodiments, receiving data values associated with the virtual device prompts the virtual network manager 726 configure the virtual device to be "online." In one embodiment, the virtual network manager 726 passively waits to receive data values related to the virtual network device. In other embodiments, the virtual network manager 726 may be configured to request updated data values associated with the virtual device from the external network interface circuit 602. At process block 1014, the virtual device data objects may be updated with the received data values.

Figure 11:
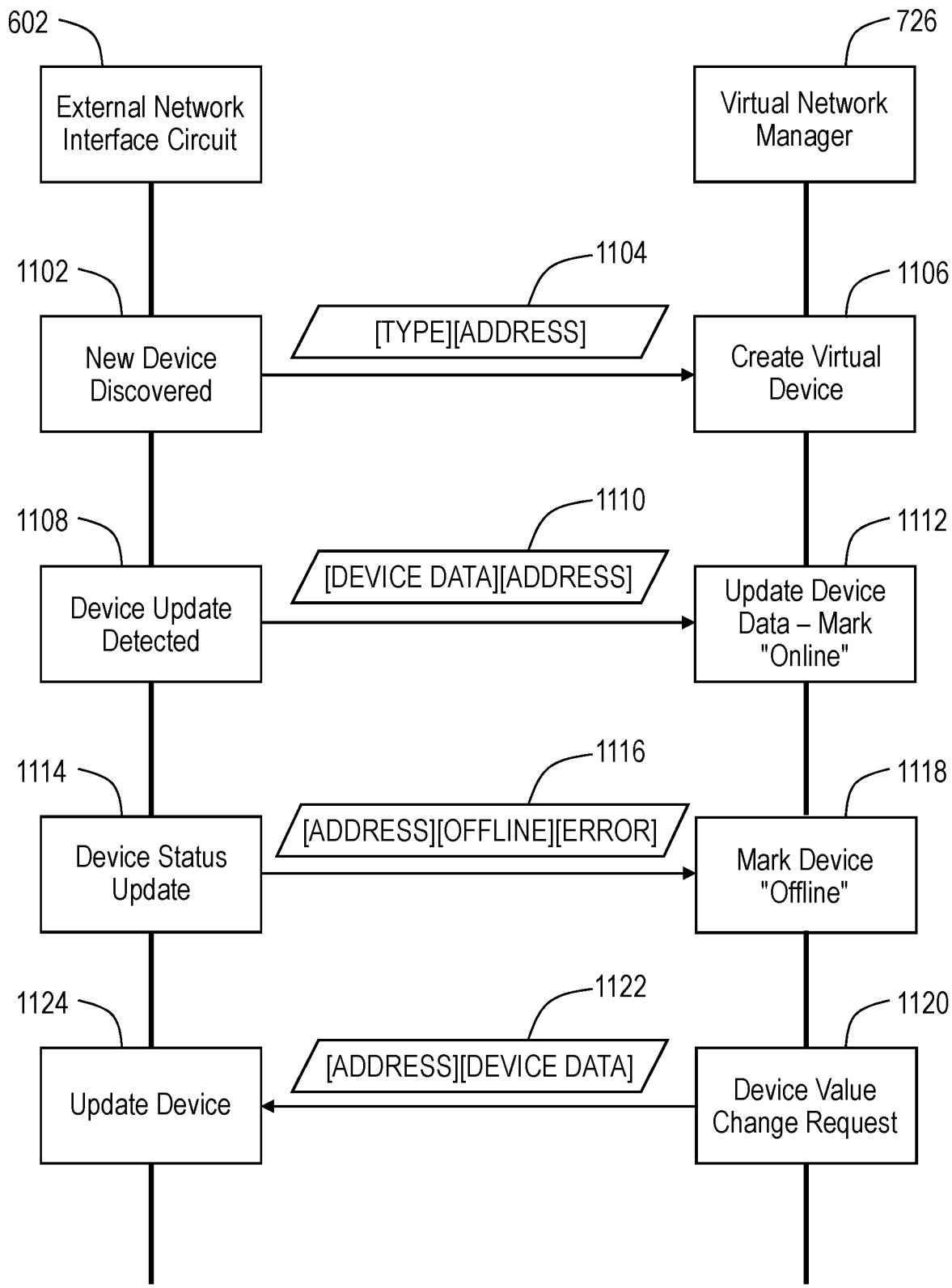
FIG. 11 is a flow chart illustrating an interface process between an external network interface circuit and a virtual network manager, according to some embodiments.

Turning now to FIG. 11, an illustration of an interface process 1100 between the external network interface circuit 602 and the virtual network manager 726 is shown, according to some embodiments. At process block 1102, a new device is discovered as described above in FIG. 10. The external network interface circuit 602 then transmits data packet 1104 to the virtual network manager 726. In one embodiment, the data packet 1104 includes a TYPE data message and an ADDRESS data message. However, other data messages are contemplated. The TYPE data message may refer to the device type. For example, the TYPE data message may indicate whether the detected discovered device is an indoor unit or an outdoor unit. In other examples, the TYPE data message may relate to a specific device type, such as whether it is an air-conditioning unit, a fan, a rooftop unit, or any other device located on the non-BMS network 504. The ADDRESS data message may be an address associated with the discovered device. In one embodiment, the ADDRESS data message is a unique MAC address supplied by the external network interface circuit 602. The virtual network manager 726 may then receive the data packet 1104 and create a virtual device at process block 1106. In one embodiment, the virtual network manager 726 creates the virtual device as described above in regards to FIG. 10.

At process block 1108 a device value change associated with one or more non-BMS devices is detected by the external network interface circuit 602. The external network interface circuit 602 then transmits data packet 1110 to the virtual network manager 726. In one embodiment, the data packet 1110 includes a DEVICE DATA data message and an ADDRESS data message. In one embodiment, the DEVICE DATA data message is a structure containing all of the data whose values are determined by the external network interface circuit 602. Accordingly, the DEVICE DATA data message may vary depending on the device type it is associated with. The ADDRESS data message may be an address associated with the discovered device. In one embodiment, the ADDRESS data message is a unique MAC address supplied by the external network interface circuit 602. The virtual network manager 726 may then receive the data packet 1110 and update the virtual device at process block 1112. In some embodiments, the virtual network manager 726 may also indicate modify the virtual device to indicate that it is "Online" after receiving updated data if the virtual device was previously indicated as "Offline."

At process block 1114, a device status update is detected by the external network interface circuit 602. The external network interface circuit 602 then transmits data packet 1116 to the virtual network manager 726. In one embodiment, the data packet 1116 includes an ADDRESS data message, and OFFLINE data message and an ERROR data message. The ADDRESS data message may be an address associated with the device having a status update. In one embodiment, the ADDRESS data message is a unique MAC address supplied by the external network interface circuit 602. The OFFLINE data message may be a binary signal indicating that the device has gone offline. In other embodiments, the OFFLINE data message may be any other type of signal indicating that the device has gone offline. The ERROR data message may indicate an error on the device. In some embodiments, the ERROR data message is an enumeration of possible error conditions for the non-BMS device. The virtual network manager 726 may then receive the data packet 1110 and update the virtual device at process block 1118. In some embodiments, the virtual network manager 726 may also indicate modify the virtual device to indicate that it is "Offline." In further examples, the virtual network manager may generate a flag to indicate that an error has occurred.

At process block 1120, the virtual network manager 726 initiates a virtual device value change request. The value change request may indicate a desired modification to a parameter of one or more BMS devices. For example, the virtual network manager 726 may receive a request to change a value of a virtual device via the BMS network 502, such as via the BAS 508. Once the virtual device value change request has been initiated at process block 1120, the virtual network manager 726 then transmits a data packet 1122 to the external network interface circuit 602. In one embodiment, the data packet 1122 includes an ADDRESS data message and a DEVICE DATA data message. The ADDRESS data message may be an address associated with the virtual device that the virtual network manager 726 requires the value to change. In one embodiment, the ADDRESS data message is a unique MAC address supplied by the external network interface circuit 602. In one embodiment, the DEVICE DATA data message is a structure containing all of the data whose values are to be modified by the external network interface circuit 602. The external network interface circuit 602 may then receive the data packet 1122 and update the non-BMS device at process block 1124.

Figure 12:
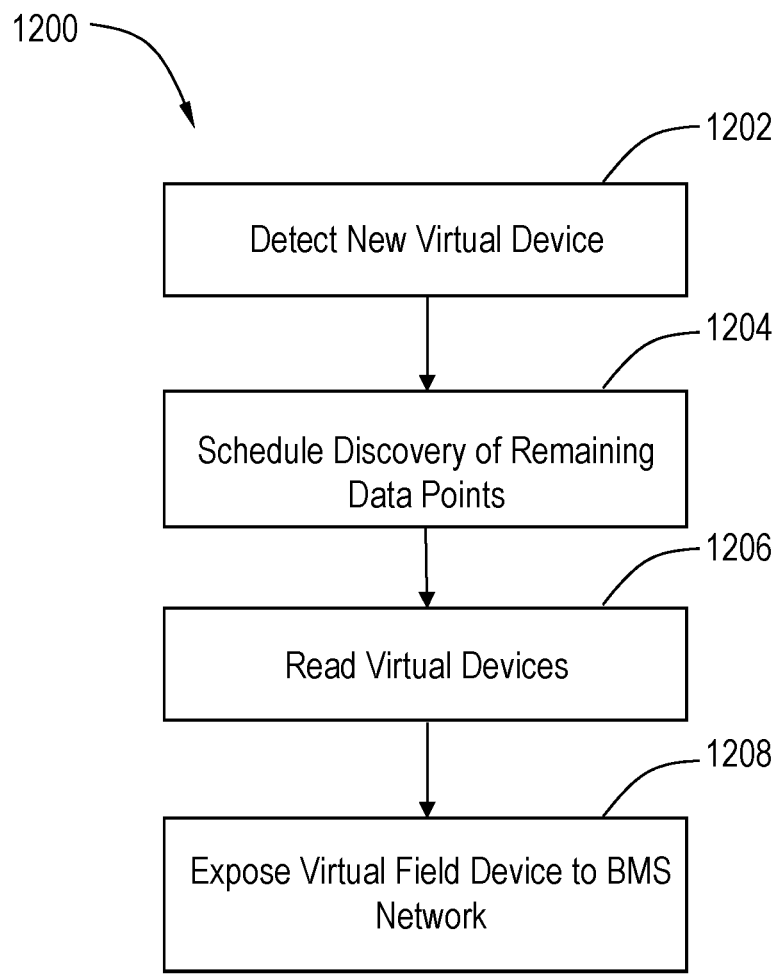
FIG. 12 is a flow chart illustrating a process for exposing virtual devices to a BMS network, according to some embodiments.

Turning now to FIG. 12, a process 1200 for exposing virtual devices to a BMS network is shown, according to some embodiments. At process block 1202, the gateway executable module 610 detects that one or more new virtual devices have been added. In one embodiment, the gateway executable module 610 may determine that a new virtual device has been added by monitoring an active node table. In one embodiment, the active node table may be stored within the memory 608 of the BMS interface circuit 600. The active node table may change as new virtual devices are added to the virtual network via the virtual network manager 726. In some embodiments, the virtual network manager 726 is configured to update the active node table when a new device is added. In other embodiments, the virtual network manager 726 may provide a signal gateway executable module when a new virtual device is added to the virtual device list 728.

At process block 1204, discovery of the remaining data points are scheduled. In one embodiment, the BMS Application Layer 714 schedules the discovery of the remaining data points. The remaining data points may be those data points within the virtual devices 710, 712 that have yet to be received from the field devices associated with the virtual devices. At process block 1206, the network layer 704 may read the new virtual devices 710, 712. The network layer 704 may receive a signal indicating that the virtual devices 710, 712 have been created or that values associated with the virtual devices 710, 712 have changed. Finally, at process block 1208 the virtual devices 710, 712 are exposed to the BMS network 502 by the network layer 704. Exposing the virtual devices 710, 712 to the BMS network 502 allows for devices or services on the BMS network 502 to see the virtual devices 710, 712 as field devices associated with the BMS network 502. In some embodiments, the virtual devices 710, 712 are configured to appear as standard BMS devices to the BMS network 502. For example, the virtual devices 710, 712 may appear to be BMS devices having one or more BACnet objects associated with them.

Turning now to FIG. 13, a screenshot illustrating an exemplary dashboard 1300 of a building automation system is shown, according to some embodiments. For example, the dashboard may be a dashboard associated with a building automation system, such as Metasys from Johnson Controls. In one embodiment, the dashboard 1300 may include a non-BMS units and spaces section 1302, and a non-BMS data section 1304. The non-BMS units and spaces section 1302 contains one or more non-BMS devices and the associated spaces that they service. In one embodiment, the building automation system can obtain this information from the smart gateway 520. The smart gateway 520, using the methods described above, may present the non-BMS devices to the building automation system such that they building automation system sees the non-BMS devices the same as it would see any other BMS device on the BMS network. Similarly, the non-BMS data section 1304 may contain data related to the one or more listed non-BMS devices. Again, this data is provided via the smart gateway 520 to the building automation system such that the building automation system sees the non-BMS device data the same as it would see BMS device data provided by BMS devices on the BMS network. Accordingly, the smart gateway provides a user with seamless interaction with non-BMS devices.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A device in communication with a first network associated with a building management system (BMS), the device comprising:
one or more processing circuits configured to:
receive a new virtual device corresponding to a physical device;
provide a mapping between the new virtual device and the physical device, one or more data points of the new virtual device corresponding to one or more data points of the physical device;
receive data values for the one or more data points of the physical device; and
update the one or more data points of the new virtual device with the data values for the one or more data points of the physical device, the new virtual device configured to represent the physical device on the first network.

2. The device of claim 1, wherein:
the data values for the one or more data points of the physical device are received via a second network on which the physical device is located; and
the one or more processing circuits are configured to transmit the data values for the one or more data points of the physical device via the first network as data values for the one or more data points of the new virtual device.

3. The device of claim 1, wherein:
the data values for the one or more data points of the physical device are received via the first network as data values for the one or more data points of the new virtual device; and
the one or more processing circuits are configured to transmit the data values for the one or more data points of the physical device via a second network on which the physical device is located as data values for the one or more data points of the physical device.

4. The device of claim 1, wherein the one or more processing circuits are configured to poll the physical device to receive data comprising a device identifier from the physical device, wherein the new virtual device being generated by a building automation and control network gateway.

5. The device of claim 1, wherein the physical device is on a second network and the one or more processing circuits are configured to provide communication between the first network and the second network via the new virtual device.

6. The device of claim 1, wherein the one or more processing circuits are configured update a status of the new virtual device on the first network responsive to at least one of:
receiving updated data values for the one or more data points of the physical device via a second network on which the physical device is located; or
receiving a device status update for the physical device via the second network.

7. The device of claim 1, wherein the first network comprises a BACnet network and the physical device is located on a second network comprising a non-BACnet network.

8. A method for providing virtual devices on a first network associated with a building management system (BMS), the method comprising:
discovering a physical device;
generating a new virtual device by a building automation and control network device responsive to a determination that a device identifier of the physical device does not match any device identifiers in a virtual device registry, the virtual device registry providing mapping between the new virtual device and the physical device, one or more data points of the new virtual device corresponding to one or more data points of the physical device;
receiving data values for the one or more data points of the physical device using a remote device; and
updating using the remote device the one or more data points of the new virtual device with the data values for the one or more data points of the physical device, the virtual device configured to represent the physical device on the first network.

9. The method of claim 8, wherein the data values for the one or more data points of the physical device are received via a second network on which the physical device is located;
the method comprising transmitting the data values for the one or more data points of the physical device via the first network as data values for the one or more data points of the new virtual device.

10. The method of claim 8, wherein the data values for the one or more data points of the physical device are received via the first network as data values for the one or more data points of the new virtual device;
the method comprising transmitting the data values for the one or more data points of the physical device via a second network on which the physical device is located as data values for the one or more data points of the physical device.

11. The method of claim 8, comprising polling the physical device to receive data comprising the device identifier from the physical device.

12. The method of claim 8, wherein the physical device is on a second network and the method comprises providing communication between the first network and the second network via the new virtual device.

13. The method of claim 8, comprising updating a status of the new virtual device on the first network responsive to at least one of:
receiving updated data values for the one or more data points of the physical device via a second network on which the physical device is located; or
receiving a device status update for the physical device via the second network.

14. The method claim 8, wherein the first network comprises a BACnet network and the physical device is located on a second network comprising a non-BACnet network.

15. One or more non-transitory computer-readable storage media having instructions stored thereon that, when executed by one or more processors, cause the one or more processors to perform operations comprising:
receiving a new virtual device associated with a physical device on a first network associated with a building management system (BMS);
using a virtual device registry to provide mapping between the new virtual device and the physical device, one or more data points of the new virtual device corresponding to one or more data points of the physical device;
receiving data values for the one or more data points of the physical device; and
updating the one or more data points of the new virtual device with the data values for the one or more data points of the physical device, the virtual device configured to represent the physical device on the first network.

16. The non-transitory computer-readable storage media of claim 15, wherein the data values for the one or more data points of the physical device are received via a second network on which the physical device is located;
the operations comprising transmitting the data values for the one or more data points of the physical device via the first network as data values for the one or more data points of the new virtual device.

17. The non-transitory computer-readable storage media of claim 15, wherein the data values for the one or more data points of the physical device are received via the first network as data values for the one or more data points of the new virtual device;
the operations comprising transmitting the data values for the one or more data points of the physical device via a second network on which the physical device is located as data values for the one or more data points of the physical device.

18. The non-transitory computer-readable storage media of claim 15, the operations comprising polling the physical device to receive data comprising a device identifier from the physical device.

19. The non-transitory computer-readable storage media of claim 15, wherein the physical device is on a second network and the operations comprise providing communication between the first network and the second network via the new virtual device.

20. The non-transitory computer-readable storage media of claim 15, the operations comprising updating a status of the new virtual device on the first network responsive to at least one of:
receiving updated data values for the one or more data points of the physical device via a second network on which the physical device is located; or
receiving a device status update for the physical device via the second network.

* * * * *